United States Patent
Yamamoto

[11] 3,966,303
[45] June 29, 1976

[54] LIQUID CRYSTAL DISPLAY UTILIZING TRANSMITTED LIGHT

[75] Inventor: Mititaka Yamamoto, Los Altos, Calif.

[73] Assignee: Omron Tateisi Electronics Co., Mountain View, Calif.

[22] Filed: July 26, 1974

[21] Appl. No.: 492,152

[52] U.S. Cl. .......................... 350/160 LC; 350/96 B
[51] Int. Cl.² ........................................... G02F 1/13
[58] Field of Search ................... 350/160 LC, 96 B; 40/106.1, 130 C; 240/2 AT

[56] References Cited
UNITED STATES PATENTS

| | | | |
|---|---|---|---|
| 1,152,156 | 8/1915 | Falk | 40/106.1 X |
| 3,566,602 | 3/1971 | Bergey et al. | 350/96 B X |
| 3,617,759 | 11/1971 | Martin | 250/227 X |
| 3,653,138 | 4/1972 | Cooper | 350/160 LC UA |
| 3,838,565 | 10/1974 | Carlyle | 350/160 LC X |
| 3,838,909 | 10/1974 | Fitzgibbons | 350/160 LC |

Primary Examiner—John K. Corbin
Assistant Examiner—Matthew W. Koren
Attorney, Agent, or Firm—Flehr, Hohbach, Test, Albritton & Herbert

[57] ABSTRACT

Apparatus for providing higher contrast ratios at the face of a liquid crystal display operated in the light transmitting mode, using means for collecting and concentrating ambient light at the rear face of the display assembly for transmission therethrough. Optical fiber bundles have a larger bundle cross section area at an end which is exposed to ambient light and are brought down to a smaller cross section area over the rear face of a liquid crystal display. Another embodiment of the invention involves the use of a plurality of bundles of optical fibers spaced to receive ambient light from different directions and led to the rear face of a liquid crystal display where the fibers from the separate bundles are mixed to provide an evenly concentrated ambient light flux density across the rear face of the display. Another embodiment involves the use of reflecting surfaces to enhance the intensity of the ambient light impinging upon the rear of the liquid crystal display for transmission therethrough. The ambient light may be concentrated to impinge upon substantially the entire rear area of a liquid crystal display by the use of a rear mounted lens for focusing available ambient light energy on the rear of the display.

2 Claims, 6 Drawing Figures

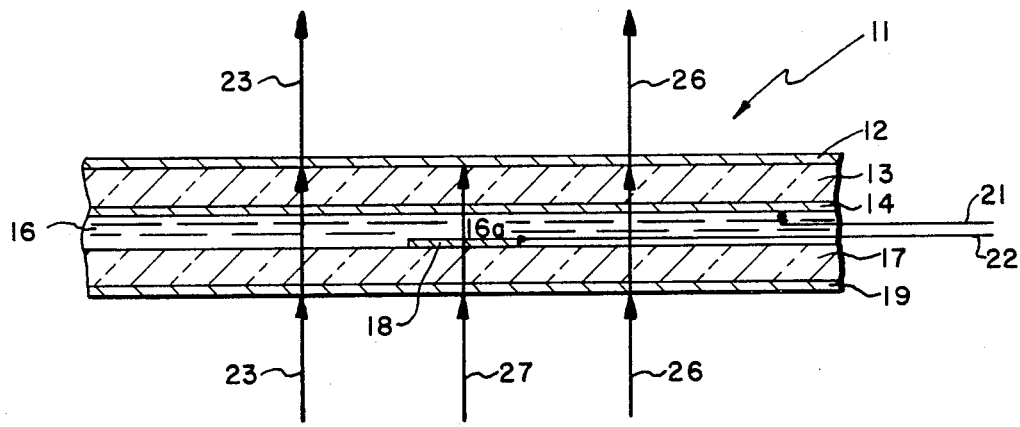
FIG.—1
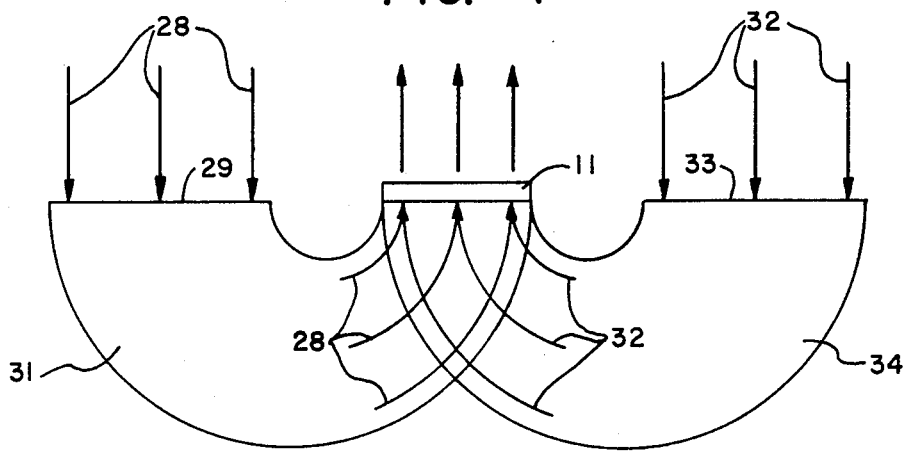
FIG.—2
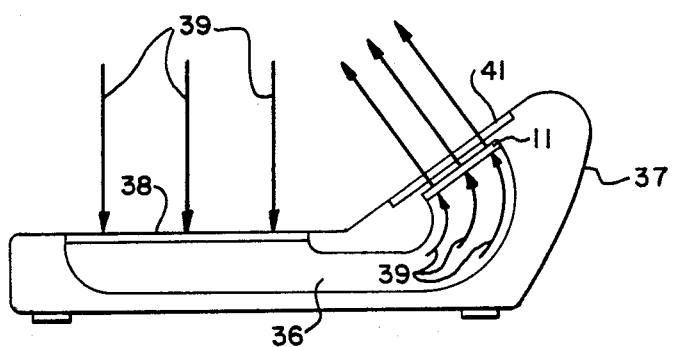
FIG.—3

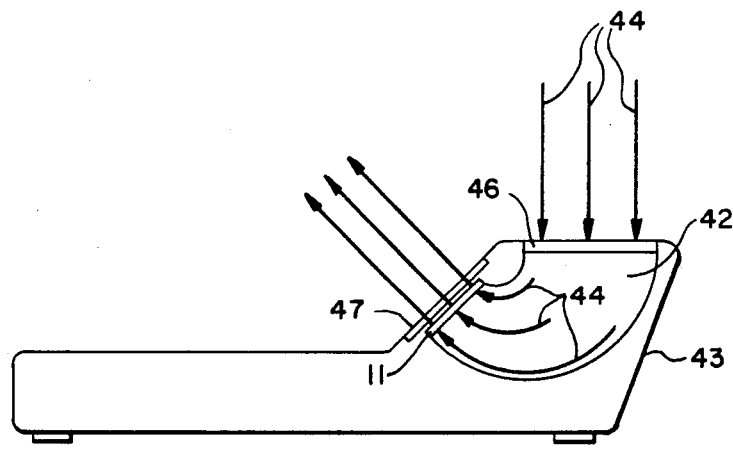
FIG.—4
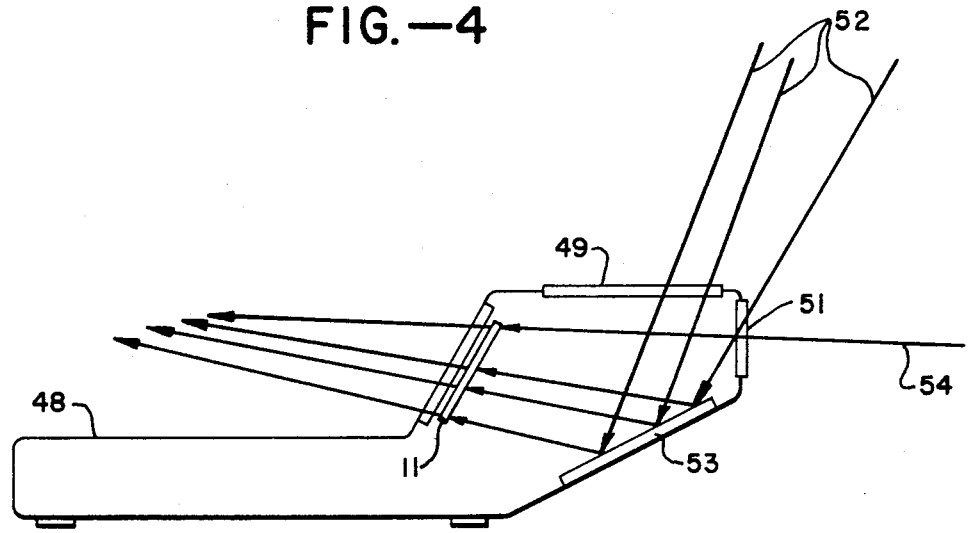
FIG.—5
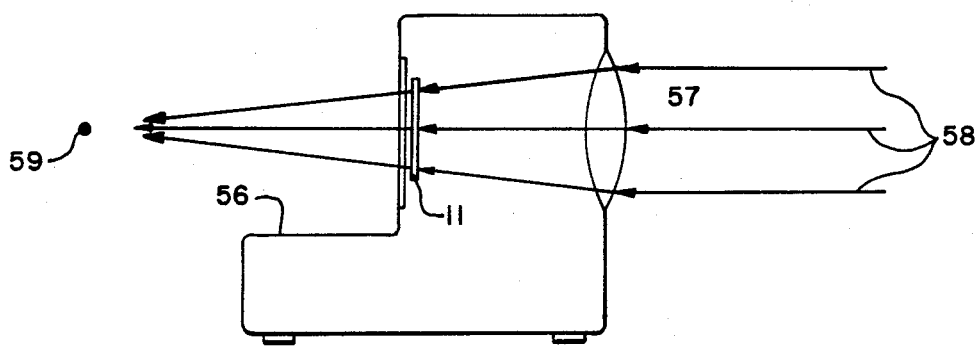
FIG.—6

LIQUID CRYSTAL DISPLAY UTILIZING TRANSMITTED LIGHT

BACKGROUND OF THE INVENTION

1. Field of the Invention

This invention relates to apparatus providing for higher contrast ratios in liquid crystal displays used in the light transmitting mode and more particularly to such liquid crystal displays utilizing optical means for concentrating available ambient light at the rear face of such liquid crystal displays.

2. Description of the Prior Art

Liquid crystal displays used in the light transmissive mode have generally required associated contained light sources to provide the light intensity levels necessary to obtain contrast ratios in the display for satisfactory readability. Transmissive mode liquid crystal displays are generally not utilized in small hand held instruments, since they are capable only of the most inefficient use of available ambient light for providing display contrast. The majority of such instruments using liquid crystal displays are therefore of the reflective mode type, whereby ambient light is passed through the display to the reflector and returned through the display to obtain the necessary contrast ratios for readability. The liquid crystal display assembly when used in the light transmissive mode does not require a backing reflector and therefore has an advantage from the standpoint of requiring fewer parts. There is therefore, a need for a liquid crystal display for use in the light transmissive mode which is capable of efficiently using the available ambient light to the exclusion of self contained light sources.

SUMMARY AND OBJECTS OF THE INVENTION

Apparatus is disclosed which utilizes a liquid crystal display assembly for use in the light transmitting mode and which is mounted in a case for positioning the face of the display before the eye of an observer. The case contains means for collecting, concentrating and directing the available ambient light onto the reverse side of the liquid crystal display internally of the case, so that areas of the display for passing light and for blocking light may be presented having high contrast ratios to the eye of an observer.

In general, it is an object of the present invention to provide a light transmissive liquid crystal display which will provide a high contrast ratio display in the absence of a self-contained light source.

It is another object of the present invention to provide a liquid crystal display which functions without the aid of a rear mounted reflector.

It is another object of the present invention to provide a light transmissive liquid crystal display which concentrates available ambient light energies at the rear side of the display for providing high contrast ratios at the face of the display.

Additional objects and features of the invention will appear from the following description in which the preferred embodiment has been set forth in detail in conjunction with the accompanying drawings.

BRIEF DESCRIPTION OF THE DRAWINGS

FIG. 1 is a sectional view of a light transmissive liquid crystal display.

FIG. 2 is a side elevational view of a light transmissive liquid crystal display and a plurality of fiber optics bundles.

FIG. 3 is a side elevational section of one embodiment of the disclosed invention in an instrument case.

FIG. 4 is a side elevational view of another embodiment of the disclosed invention in an instrument case.

FIG. 5 is a side elevational section view of an embodiment of the disclosed invention using a case mounted lens.

DESCRIPTION OF THE PREFERRED EMBODIMENTS

Referring to FIG. 1, a liquid crystal display 11 is seen for use in the light transmissive mode. As seen therein, a layered sequence is shown including a first light polarizer 12 is mounted adjacent to a first transparent support plate 13. A covering transparent electrode 14 is mounted on one side of transparent support plate 13. A liquid crystal 16, of the twist nematic or field effect type in this example, is shown in electrical contact with covering transparent electrode 14. It should be noted that the inventive concept disclosed herein is equally applicable to use with liquid crystals of the cholesteric or smectic phases. A second transparent support plate 17 is shown adjacent liquid crystal 16. An array of transparent electrodes 18 is mounted on second transparent support plate 17 and electrical contact with liquid crystal 16. A second light polarizer 19 is positioned adjacent to second transparent support plate 17. Electrical leads 21 and 22 are connected to covering transparent electrode 14 and individual electrodes in the array of transparent electrodes 18 respectively.

The manner in which liquid crystal display assembly 11 functions is as follows; the twist nematic liquid crystal 16 has the property of reorienting the planar polarized light through 90° as it passes therethrough. However, when an electric field is set up within a volume of liquid crystal 16, as by impressing an electrical potential across such a volume, this property disappears. As seen in FIG. 1, if an electrical potential is impressed across leads 21 and 22, the volume of liquid crystal 16 seen at 16a will experience the presence of an electrical field. When the voltage impressed across leads 21 and 22 reaches a sufficiently high magnitude, volume 16a will no longer "twist" a planar polarized light beam as it passes therethrough. Consequently, a light beam 23 impinging upon the rear surface of liquid crystal display assembly 11 will pass through second light polarizer 19 and assume the polarization orientation induced thereby. Assuming such orientation to be designated Y, light beam 23 will continue through liquid crystal 16 being rotated 90° thereby to assume an orientation designated X as it emerges from the front side thereof. Assuming light polarizer 12 is oriented in the X direction, light beam 23 will pass therethrough to be observed by the eye 24 of an observer. Any other light ray such as at 26 will similarly pass through the liquid crystal display assembly 11 if it does not pass through a volume such as at 16a while an electric field exists therein. It should be noted that a ray of light energy such as 27 will also pass through the liquid crystal display assembly 11 if insufficient electrical potential is impressed across transparent electrode 14 and individual ones of the array of transparent electrodes 18.

Whenever a sufficient electrical potential is so impressed between the aforementioned electrodes 14 and 18, an elemental beam of light 27 is polarized in the Y direction as it passes through the rear surface of the display assembly 11 by second light polarizer 19. The light beam 27 polarized in the Y direction continues through the volume of liquid crystal 16a wherein its axis of polarization remains undisturbed due to the electrical field existant in volume 16a. In this fashion, light beam 27 approaches first light polarizer 12 oriented in the Y direction, whereupon it is blocked by light polarizer 12 oriented in the X direction. The eye 24 of an observer therefore, sees a dark spot of the point on the face of the liquid crystal display where elemental beam 27 is blocked.

Turning now to FIG. 2, the manner in which ambient light is directed to the rear surface of liquid crystal display 11 will be described. Elemental beams of ambient light 28 which may have random direction, are shown approaching one end 29 of a first bundle of fiber optics 31. Additional beams of ambient light 32, also approaching from any direction, are shown impinging on the exposed end 33 of a second bundle of fiber optics 34. Fiber optics bundles 31 and 34 are directed to the rear of liquid crystal display assembly 11. The cross sectional area of the fiber optic bundles 31 and 34 at the end adjacent to liquid crystal display 11 is smaller than the cross sectional area at ends 29 and 33 respectively. As shown in FIG. 2, the fibers in bundles 31 and 34 are intermixed at the rear face of liquid crystal display assembly 11 so that if light beams 28 are of higher intensity than light beams 32, there will still be uniform illumination throughout display assembly 11. In this fashion, larger areas 29 and 33 are exposed to ambient light for collection thereof, which is concentrated and directed at a higher flux density to a smaller area on the rear face of display assembly 11 for providing higher contrast ratios between light transmitting and blocking areas when a liquid crystal display assembly 11 is operated as described above.

FIG. 3 is an additional embodiment of the inventive concept disclosed herein to show a bundle of fiber optics 36 mounted within an instrument case 37 and having a large area end 38 exposed to ambient light beams 39. Light beams 39 are conducted through fiber optics bundle 36 to impinge on the rear face of liquid crystal display assembly 11 also mounted in case 37. Fiber optics bundles 36 has a smaller area at the end adjacent the liquid crystal display assembly 11, whereby ambient light beams 39 are presented to the rear face of display assembly 11 having a higher light flux density than ambient. When liquid crystal display assembly 11 is operated as described above, higher contrast ratios are presented to the eye of an observer viewing the face plate 41 on instrument case 37.

Referring to FIG. 4, an embodiment is shown wherein a fiber optics bundle 42 is positioned to the rear of an instrument case 43 for receiving ambient light beams 44 at a large area end 46, for conduction to the rear face of the liquid crystal display assembly 11 having a smaller rear face area than area 46 as described for the embodiment of FIG. 3 above. In a fashion similar to that described above, higher contrast ratios are obtained than would be provided by ambient light intensity at a face plate 47 in instrument case 43.

Turning now to FIG. 5 an embodiment using liquid crystal display assembly 11 is shown having an instrument case 48 in which is mounted display assembly 11. Openings 49 and 51 in the upper and rear portions respectively of case 48 are provided through which ambient light may be transmitted. Ambient light rays 52 may approach openings 49 and 51 from any direction to impinge upon the surface of a reflector 53 mounted internally in the case 48. Reflector 53 is situated to reflect rays 52 to the rear surface of liquid crystal display assembly 11. Additional ambient light rays 54 may enter through opening 51 for direct impingement on the rear surface of display assembly 11. Openings 49 and 51 may have transparent coverings disposed therein if it is desirable to prohibit external atmospheres from entering case 48. In this fashion direct and reflected ambient light rays 54 and 52 respectively are concentrated on the rear face of liquid crystal display 11 for providing high contrast ratios to the eye of an observer as heretofore described.

FIG. 6 shows an alternative configuration utilizing the light transmissive liquid crystal display assembly 11 mounted in an instrument case 56. A lens 57 is mounted in the rear of case 56 for concentrating ambient light rays 58 across the rear surface of liquid crystal display 11. In this fashion, ambient light 58 is collected, and directed to be concentrated at display assembly 11 for providing high contrast ratios when display assembly 11 is operated and viewed as described above. Presuming liquid crystal display assembly 11 does not appreciably scatter light rays 58, the optimum observation point will be at a focal point 59 of lens 57. It should be noted that the liquid crystal display assembly 11 may be operated in what could be termed a "negative mode" by aligning the polarization axes of first and second light polarizers 12 and 19 in parallel relation. When operated in the light transmissive mode such a display 11 will provide a light image on a dark background. It should also be noted that if a liquid crystal display of the dynamic light scattering type is used, the light polarizing members 12 and 19 are no longer necessary. A combination using a liquid crystal display in the light transmissive mode has been disclosed which provides high contrast ratios to a viewer of the display using ambient light without auxiliary light sources.

I claim:

1. In combination with a liquid crystal display for use in a light transmitting mode, a case for mounting the liquid crystal display, at least one fiber optics bundle positioned in said case having one end exposed to ambient light and the other end in juxtaposition with the reverse side of the liquid crystal display for collecting ambient light at said one end and for concentrating and directing the ambient light on the reverse side of the liquid crystal display, said fiber optics having a larger cross sectional area at said one end then at said other end, whereby light flux density at the reverse side of the liquid crystal display is higher than ambient, thereby passing through the display for providing sufficiently high light contrast ratios to allow visual interpretation in relatively low ambient light conditions.

2. A combination as in claim 1 together with a plurality of fiber optics bundles each having said one end positioned at different positions around said case for exposure of said one ends to ambient light sources in different positions, and wherein said fiber optics are intermixed among said bundles at said other end, so that collected ambient light will be evenly distributed across the reverse side of the liquid crystal display when the different ambient light sources are producing different levels of light flux density.

* * * * *

UNITED STATES PATENT OFFICE
CERTIFICATE OF CORRECTION

PATENT NO. : 3,966,303
DATED : June 29, 1976
INVENTOR(S) : Mititaka Yamamoto

It is certified that error appears in the above–identified patent and that said Letters Patent are hereby corrected as shown below:

On the front page of the patent, under Assignee, change the address from "Mountain View, California" to read --Kyoto, Japan--.

Signed and Sealed this

Thirty-first Day of October 1978

[SEAL]

Attest:

RUTH C. MASON
Attesting Officer

DONALD W. BANNER
Commissioner of Patents and Trademarks